(12) United States Patent
Mello et al.

(10) Patent No.: US 9,454,605 B1
(45) Date of Patent: Sep. 27, 2016

(54) TRANSFERRING DATA BETWEEN DEVICES USING BAR CODES

(71) Applicant: EMC Corporation, Hopkinton, MA (US)

(72) Inventors: Brian J. Mello, Tewksbury, MA (US); Gregory R. Gallagher, Newton, MA (US); Robert McFadries, Ashburnham, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/484,945

(22) Filed: Sep. 12, 2014

(51) Int. Cl.
*H04L 29/06* (2006.01)
*G06F 17/30* (2006.01)
*G06K 7/14* (2006.01)
*G06K 7/10* (2006.01)
*H04L 9/32* (2006.01)

(52) U.S. Cl.
CPC ..... *G06F 17/30861* (2013.01); *G06K 7/10821* (2013.01); *G06K 7/1408* (2013.01); *H04L 9/3247* (2013.01); *H04L 2209/24* (2013.01); *H04L 2209/72* (2013.01)

(58) Field of Classification Search
CPC .......... G06F 17/30861; H04L 9/3247; H04L 2209/72; H04L 2209/24; G06K 7/1408; G06K 7/10821

USPC ......................................................... 713/171
See application file for complete search history.

(56) References Cited

U.S. PATENT DOCUMENTS

| 2002/0053032 | A1 | 5/2002 | Dowling et al. |
| 2003/0112471 | A1* | 6/2003 | Damera-Venkata G06K 19/06028 358/3.28 |
| 2011/0131638 | A1 | 6/2011 | Kan |
| 2011/0197280 | A1 | 8/2011 | Young et al. |
| 2015/0088999 | A1* | 3/2015 | Carr ........................ H04L 51/30 709/206 |

* cited by examiner

*Primary Examiner* — Mohammad W Reza
(74) *Attorney, Agent, or Firm* — BainwoodHuang (57) ABSTRACT

Improved techniques involve transferring data into a target device using bar codes. Along these lines, suppose that someone wants to send a message to the target device via a source device. For some messages, the source device may encode the message into a single bar code that the target computer may decode back into the message. However, for a sufficiently large message, the source device breaks the message into a series of message portions, encodes each of the portions into a distinct bar code, and outputs the bar codes, e.g., on sheets of paper using a laser printer. From these sheets, an operator scans each bar code into the target device. The target computer then decodes the scanned bar codes back into message portions and reassembles them into the message.

23 Claims, 6 Drawing Sheets

TRANSFERRING DATA BETWEEN DEVICES USING BAR CODES

BACKGROUND

An air gap or air wall refers to an approach to protecting a computer (or computer network) from malicious attacks. In particular, the operator of such a computer isolates the computer from untrusted networks (e.g., no physical connectivity to a public network, no WiFi, etc.). Accordingly, the computer is well-protected from malware, viruses, network hacking, and so on.

During operation of the computer, a user may enter data into the computer by typing into a standard keyboard. In this manner, the user is able to input information, as well as direct the computer to perform various tasks.

SUMMARY

It should be understood that there are deficiencies to the above-described approach to operating a computer protected by an air gap. For example, suppose that there is a relatively large amount of data to be entered into the computer. Unfortunately, manually typing data into the computer is burdensome, prone to error, and time consuming.

In contrast to the above described approach to operating a computer protected by an air gap which requires a user to manually type data into the computer, improved techniques are directed to transferring data into a target computer via a series of bar codes. Along these lines, an untrusted computer is able to divide the data into separate data portions and provide multiple bar codes, each bar code containing a respective data portion and metadata identifying how that respective data portion relates to the other data portions (e.g., data portion 1 of 3, data portion 2 of 3, etc.). In some arrangements, the metadata provides additional information such as a series identifier to enable the target computer to distinguish one series of bar codes from another, a checksum for error detection and/or correction, a time to live parameter to prevent the target computer from processing a stale series of bar codes, and so on. With such an improvement, a large amount of data can be input into the target computer easily, quickly, and without error. Moreover, when the data of the bar codes is interpreted as text only by the target computer, there is no opportunity for the target computer to succumb to malware, viruses, network hacking, etc.

One embodiment of the improved techniques is directed to a method of transferring a message into a target device. The method includes receiving a set of bar codes provided by a source device. The method also includes decoding the set of bar codes to reveal i) message portions, and ii) a sequencing scheme for arranging the message portions into the message. The method further includes arranging the message portions according to the sequencing scheme to produce the message.

Additionally, some embodiments of the improved technique are directed to an apparatus. The apparatus includes memory and control circuitry coupled to the memory. The memory stores instructions which, when carried out by the control circuitry, cause the control circuitry to perform the method of transferring a message into a target device.

Furthermore, some embodiments of the improved technique are directed to a computer program product comprising a non-transitory, computer-readable storage medium which stores executable code, which, when executed by a target device, causes the computing device to perform the method of transferring a message into a target device.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques involve transferring data into a target device using bar codes. Along these lines, suppose that someone wants to send a message to the target device via a source device. For some messages, the source device may encode the message into a single bar code that the target computer may decode back into the message. However, for a sufficiently large message, the source device breaks the message into a series of message portions, encodes each of the portions into a distinct bar code, and outputs the bar codes, e.g., on sheets of paper using a laser printer. From these sheets, an operator scans each bar code into the target device. The target computer then decodes the scanned bar codes back into message portions and reassembles them into the message.

Figure 1:
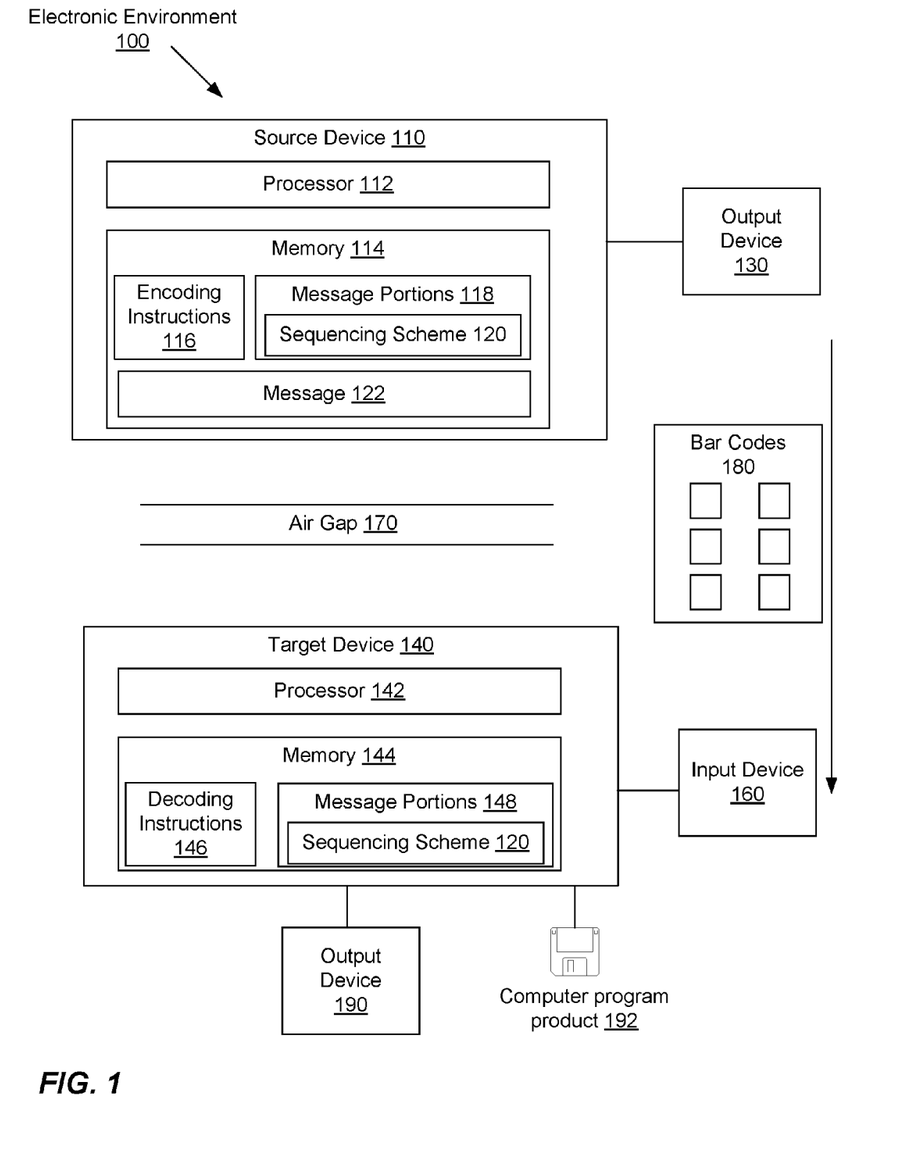
FIG. 1 is a block diagram illustrating an example electronic environment in which the improved technique is carried out.

FIG. 1 illustrates an example electronic environment 100 in which the improved techniques hereof can be carried out. Electronic environment 100 includes a source device 110 and a target device 140 separated by an air gap 170. Nevertheless, it should be understood that the improved techniques also apply to environments that do not use air gaps.

Source device 110 is configured to encode a message in bar codes 180. In the example shown in FIG. 1, source device 110 is implemented as a computer that includes a processor 112, memory 114, and an output device 130. Source device 110 may be connected to a public network such as the internet, but this is not a requirement.

Processor 112 is a central processing unit (CPU) configured to execute encoding instructions 116 stored in memory 114. Processor 112 may be a single- or multi-core, with each core capable of executing multiple threads.

Memory 114 is configured to store various software constructs running on source device 110, such as encoding instructions 116. As illustrated in FIG. 1, memory 114 further stores data such as message portions 118 including sequencing scheme 120, and message 122.

Encoding instructions 116, when executed by processor 112, cause processor 112 to encode message portions 118 into bar codes 180. Encoding instructions 116, when executed by processor 112, also cause processor 112 to break message 122 up into message portions 118.

It should be understood that encoding instructions 116, as part of breaking message 122 up, cause processor 112 to generate sequencing scheme 120. For example, sequencing scheme 120 may take the form of labeling a message portion 118 as "portion x of y total portions" in message 122.

Output device 130 is configured to provide bar codes 180 on output media. In this example, output device 130 is a laser printer that prints bar codes 180 on sheets of paper 182. Alternatively, output device 130 may be a tablet computer that displays bar codes on a LED screen.

Bar codes 180 may take the form of any standard bar code. In the description that follows, each bar code 180 is a data matrix, although in other arrangements, each bar code 180 may be a QR code, a 1D bar code, or the like.

Target device 140 is configured to decode bar codes 180 and hence produce message 122. In the example shown in FIG. 1, target device 140 is implemented as a computer that includes a processor 142, memory 144, an input device 160, and an output device 190. Target device 140 is completely isolated from any public network and untrusted devices by air gap 170.

In this example, processor 142 is a central processing unit (CPU) configured to execute decoding instructions 146 stored in memory 144 among other functions. Processor 142 may be a single- or multi-core, with each core capable of executing multiple threads.

Memory 144 is configured to store various software constructs running on target device 140, such as decoding instructions 146. Memory 144 further stores data such as decoded message portions 148 and sequencing scheme 120.

Decoding instructions 146, when executed by processor 142, cause processor 142 to decode bar codes 180 to reveal decoded message portions 148. It should be understood that, due to input errors, decoded message portions 148 might not necessarily be the same as respective message portions 118 stored in memory 114 on source device 110. Decoding instructions 146, when further executed by processor 142, cause processor 142 to arrange message portions 148 into message 122 according to sequencing scheme 120.

Input device 160 is configured to transfer information encoded within bar codes 180 into target device 140. In this example, input device 160 is a bar code reader that may scan a data matrix efficiently, such as a laser scanner or a digital camera.

Output device 190 is configured to communicate error information with an operator who inputs bar codes into target computer 140. In this example, output device 190 is a display device such as a monitor.

During operation, source device 110 receives message 122 to be sent to target computer 140. For example, message 122 may represent data for updating a database stored in a storage device connected to target device 140. In some arrangements, message 122 represents a set of instructions arranged as a web service message having, e.g., SOAP or REST formats. In such arrangements, message 122 contains textual strings.

In some arrangements, after receiving message 122, processor 112 performs a compression operation on message 122 that converts, e.g., textual strings of message 122 into a binary string. The compression operation may use an algorithm to compress message 122 into a binary string of a smaller size. In some further arrangements, processor 112 uses a public key from a public/private key pair generated by target device 140 to encrypt as well as compress message 122. Such encryption may provide additional security as a human operator would be prevented from accessing the content of message 122.

Regardless of representation, processor 112 then breaks message 122 up into equally sized message portions 118. Processor 112 determines the size of each portion 118 based on the size of a bar code 180. For example, bar codes 180 that take the form of data matrices can hold up to 500 bytes of data. For the case of a binary string, processor 112 may then break the binary string up into 500-byte portions (i.e., 4000 binary digits).

However, in order to facilitate an error-tolerant message transfer between source device 110 and target device 140, processor 112 adds data to each message portion 118 that indicates the position of that portion in message 122. The data forms part of sequencing scheme 120, which processor 112 stores in memory 114 along with message portions 118. In some arrangements, sequencing scheme 120 represents an assignment of a distinct sequence number (e.g., "portion x of y portions") to each respective message portion. In this case, processor 122 adds such a sequence number as well as the total number of portions in message 122 to each respective message portion 122. Because each bar code 180 represents a fixed data size, processor 112 takes into account the number of bytes in the sequence numbers when breaking message 122 up into message portions 118.

In some arrangements, after processor 112 creates message portions 118, processor 118 converts each message portion 118 to a base64 representation. An advantage of using base64 representation is a reduction in the likelihood of transmission errors. For the case of a binary string, processor 112 maps sextets of binary digits in each binary string to a 64-bit character symbol.

Regardless of representation, processor 112 encodes each message portion 118 in a bar code 180, e.g., a data matrix. Processor 112 then sends bar codes 180 to output device 130 message 122 may be transferred to target device 140 over air gap 170, e.g., by an operator. Typically, processor 112 sends data representing bar codes 180 to output device 130 via an SSL or another secure connection. In some arrangements, output device 130 is a printer, e.g., a laser printer, which prints bar codes 180 on sheets of paper. However, it should be understood that output device may instead take the form of a tablet computer.

Once processor 112 has output bar codes 180, processor 142 may receive the data from bar codes 180 via input device 160. For example, an operator may manually scan each bar code 180 via a scanner connected to target device 140. Because each bar code 180 contains information about its position with respect to message 122 (e.g., from sequence numbers), processor 142 will be capable of assembling message 122 independent of the order in which bar codes 180 are scanned.

Upon receiving bar codes 180, processor 142 decodes each of bar codes 180 to reveal respective message portions 148 and sequencing scheme 120. It should be understood that operator and/or device error may render the message portions 148 different from message portions 118. For example, if a defect in a bar code 180 leads to a misread, then the resulting message portion 148 may differ from respective message portion 118 used to create that bar code 180.

Once message portions 148 and sequencing scheme 120 have been revealed through decoding, processor 142 arranges message portions 148 according to sequencing scheme 120. If there are no errors, then processor 142 may produce message 122 from the arranged message portions 148. If, however, there are errors, then processor 142 will likely not be able to produce message 122 from the arranged message portions 148. Nevertheless, processor 142 is capable of detecting an error condition and communicating it to, e.g., an operator. In this way, the operator need only be concerned with correcting a single bar code rather than restarting the scan of all bar codes 180. Such detection is discussed in connection with FIG. 2, FIG. 3, and FIG. 4.

Figure 2:
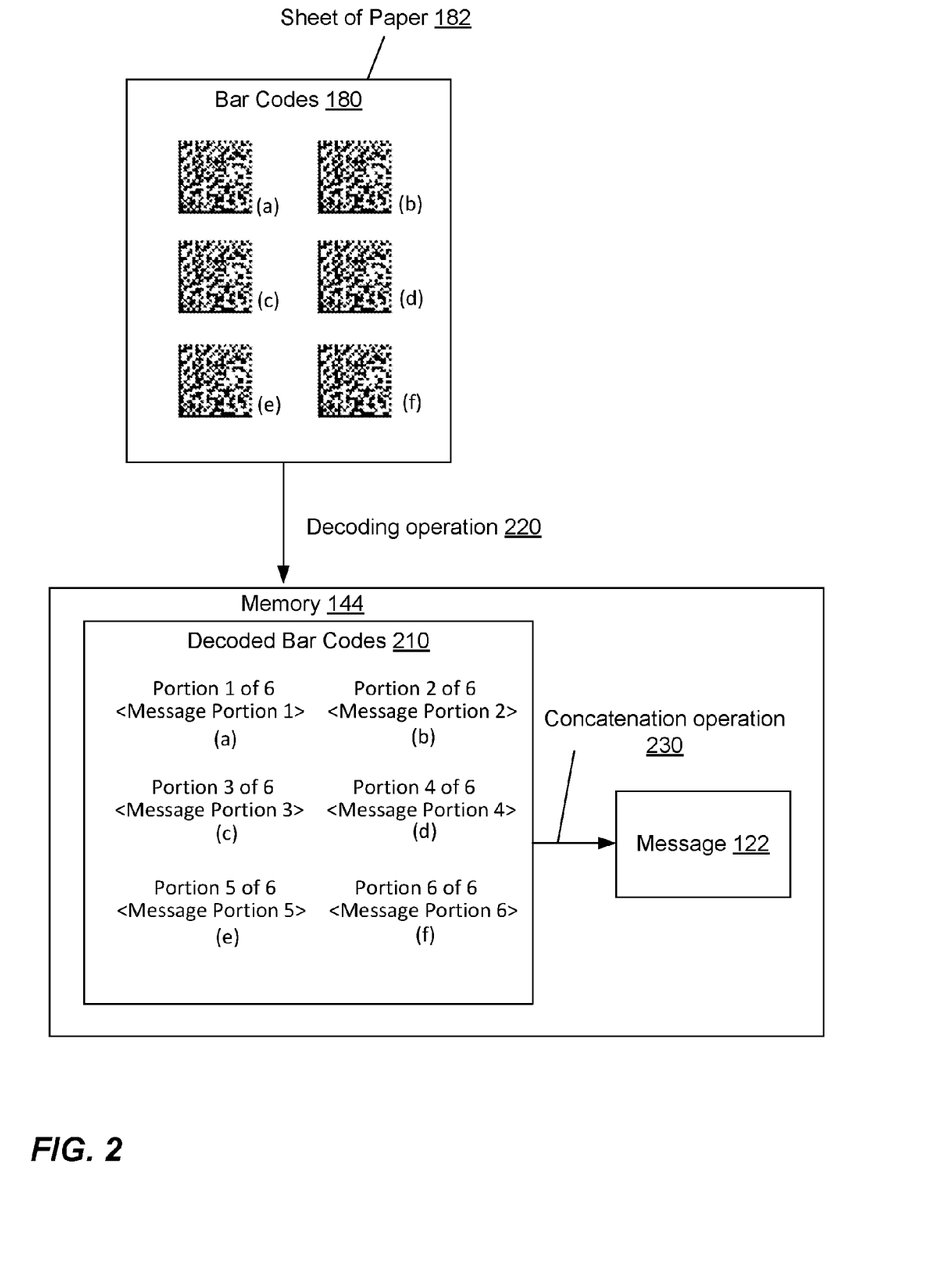
FIG. 2 is a block diagram illustrating an example decoding operation within the electronic environment shown in FIG. 1.

FIG. 2 illustrates an example reconstruction of message 122 from bar codes 180. In this example, there are six bar codes 180, 180(a), 180(b), 180(c), 180(d), 180(e), and 180(f) in the form of data matrices printed on a sheet of paper 182. Generally, there may be any number of bar codes on a sheet of paper, and there may be multiple sheets of bar codes from a single message. In alternative arrangements, the bar codes may be displayed on a monitor of, e.g., a tablet computer. In any case, a scanner connected to target device 140 (see FIG. 1) scans bar codes 180 to transfer the data represented by bar codes 180 to target device 140.

Once bar codes 180 are scanned, target device 140 performs a decoding operation 220 to produce decoded bar codes 210 for storage in memory 144. For each bar code 180(a)-(f), there is a corresponding decoded bar code 210(a), 210(b), 210(c), 210(d), 210(e), and 210(f).

Each decoded bar code 210 includes a message portion and a sequence number. For example, decoded bar code 210(a), resulting from bar code 180(a), includes a message portion and a sequence number "1", meaning that this message portion is the first message portion in message 122. Decoded bar code 210(b), resulting from bar code 180(b), includes another message portion and a sequence number "2", meaning that this message portion is the second message portion in message 122, and so on. It should be understood, however, that bar codes 180 might be scanned in any order, so that the message portions may be arranged in memory 144 in any order.

Along these lines, sequencing scheme 120 (see FIG. 1) is an assignment of a sequence number to a message portion. Target device 140 arranges the message portions according to the sequencing scheme so that, upon performing a concatenation operation 230, the message portions are in the correct order to produce message 122.

Figure 3:
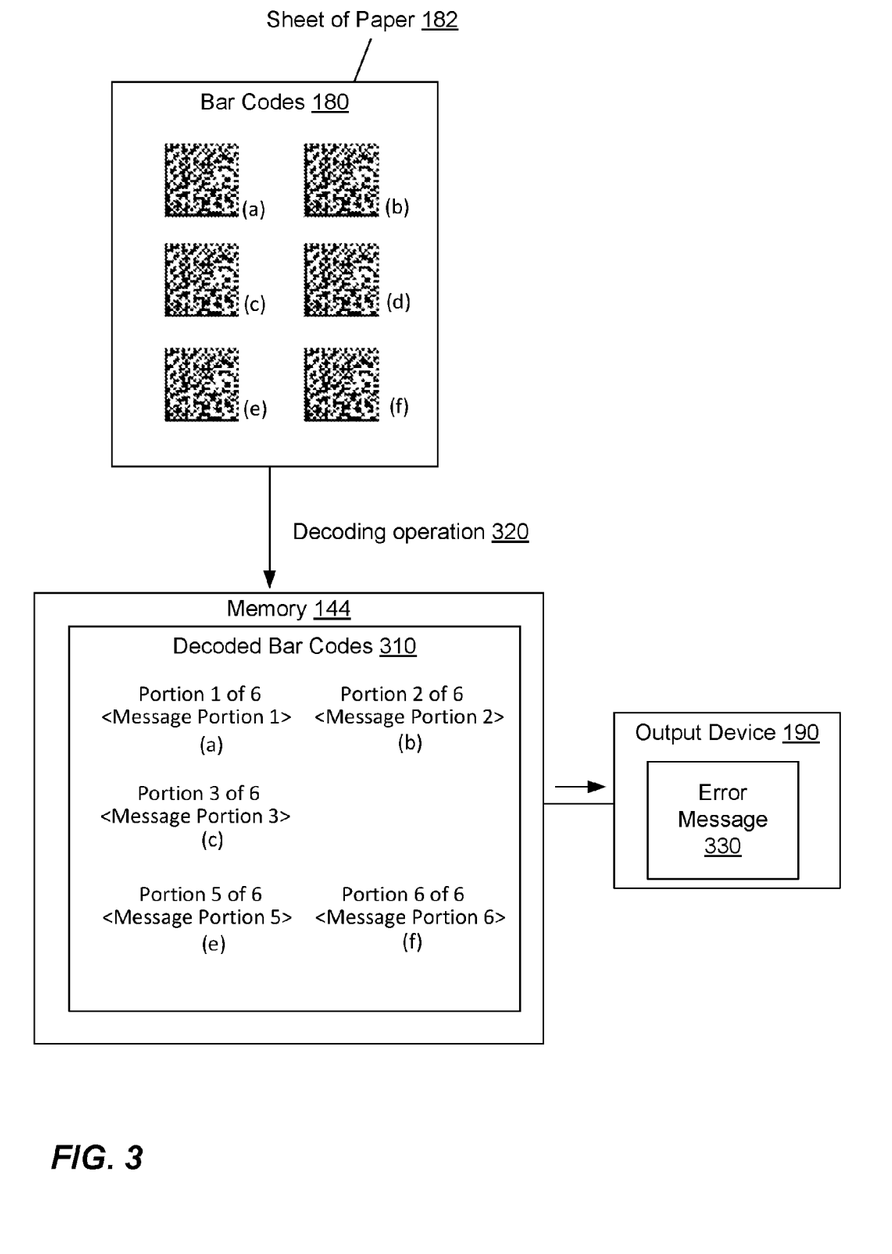
FIG. 3 is a block diagram illustrating an example error detection operation within the electronic environment shown in FIG. 1.

FIG. 3, however, illustrates an example scenario in which the fourth bar code 180(d) was skipped in the process of scanning. Thus, decoded bar codes 310 resulting from decoding operation 320 are missing the fourth portion, i.e., decoded bar code 310(d). In this example scenario, target device 140 (see FIG. 1) detects that the sequence number "4" is missing upon arrangement of the message portions. In response, target computer 140 produces an error message 330, which is sent to output device 190. For example, error message 330 may notify an operator that bar code 180(d) needs to be scanned.

Figure 4:
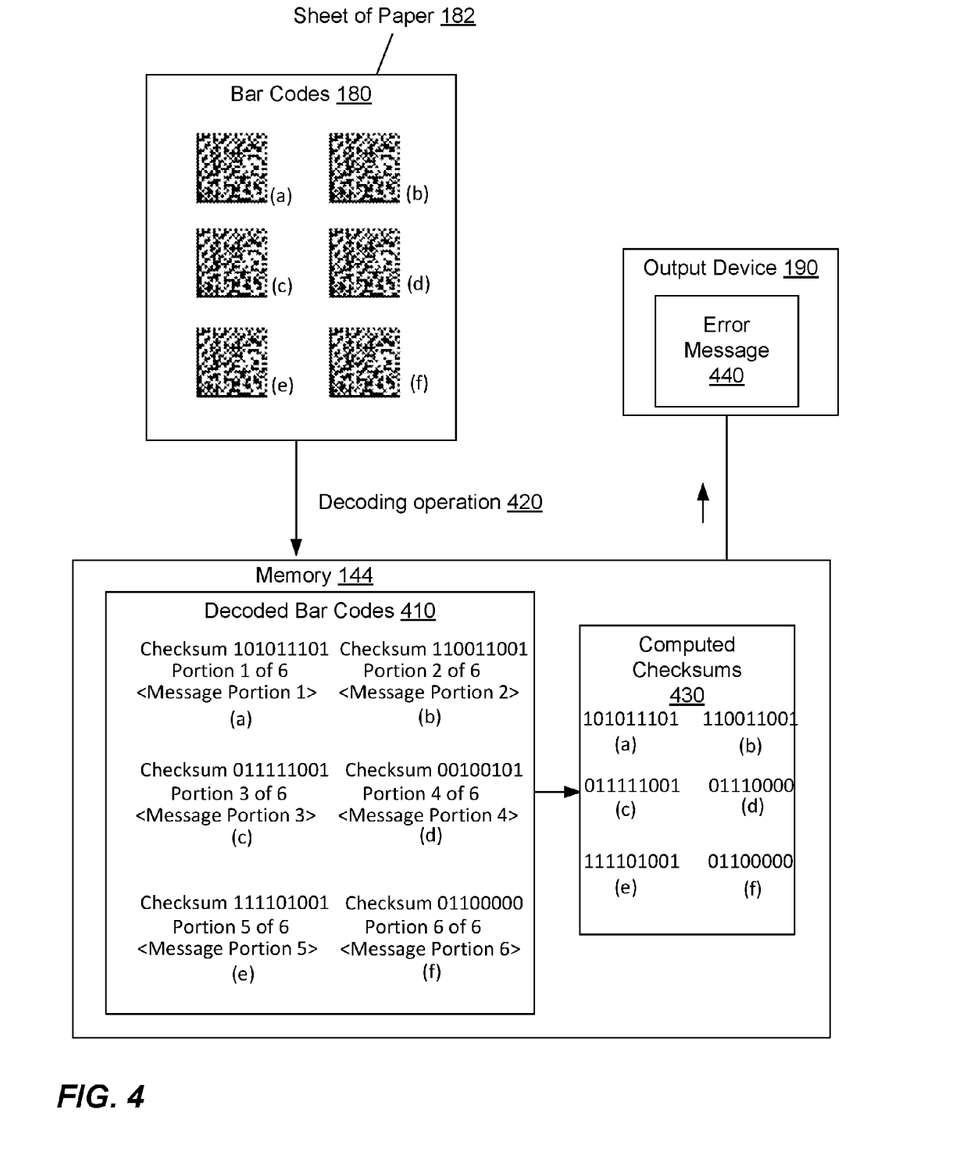
FIG. 4 is a block diagram illustrating another example error detection operation within the electronic environment shown in FIG. 1.

FIG. 4 illustrates another example scenario in which there may be an error in a scanned bar code 180(d). In order to detect such errors, source device 110 adds to each message portion, prior to encoding, a checksum. In some arrangements, the checksum is a hash of the message portion. In this case, upon decoding, target device 140 would compute the same hash of the message portion revealed upon performing decoding operation 420 and compare the computed hash with the checksum revealed upon decoding. A difference between the checksums for any message portion would uncover an error.

In the example scenario illustrated in FIG. 4, decoding operation 420, in the process of producing decoded bar codes 410, produces computed checksums 430 which are hashes of respective message portions. For example, decoding bar code 180(d) produces a message portion with a sequence number "4" as before, but also having a checksum "00100101". However, as part of decoding operation 420, target device 140 also computes the hash of this message portion, which produces computed checksum 430(d) equal to "01110000". As the included checksum in decoded bar code 410(d) and the respective computed checksum 430(d) differ, there is a possible error in decoding bar code 180(d). In response, target device 140 produces error message 440 and displays error message 440 on output device 190. For example, error message 440 may notify an operator that bar code 180(d) has an error and may need to be regenerated on source device 110.

Figure 5:
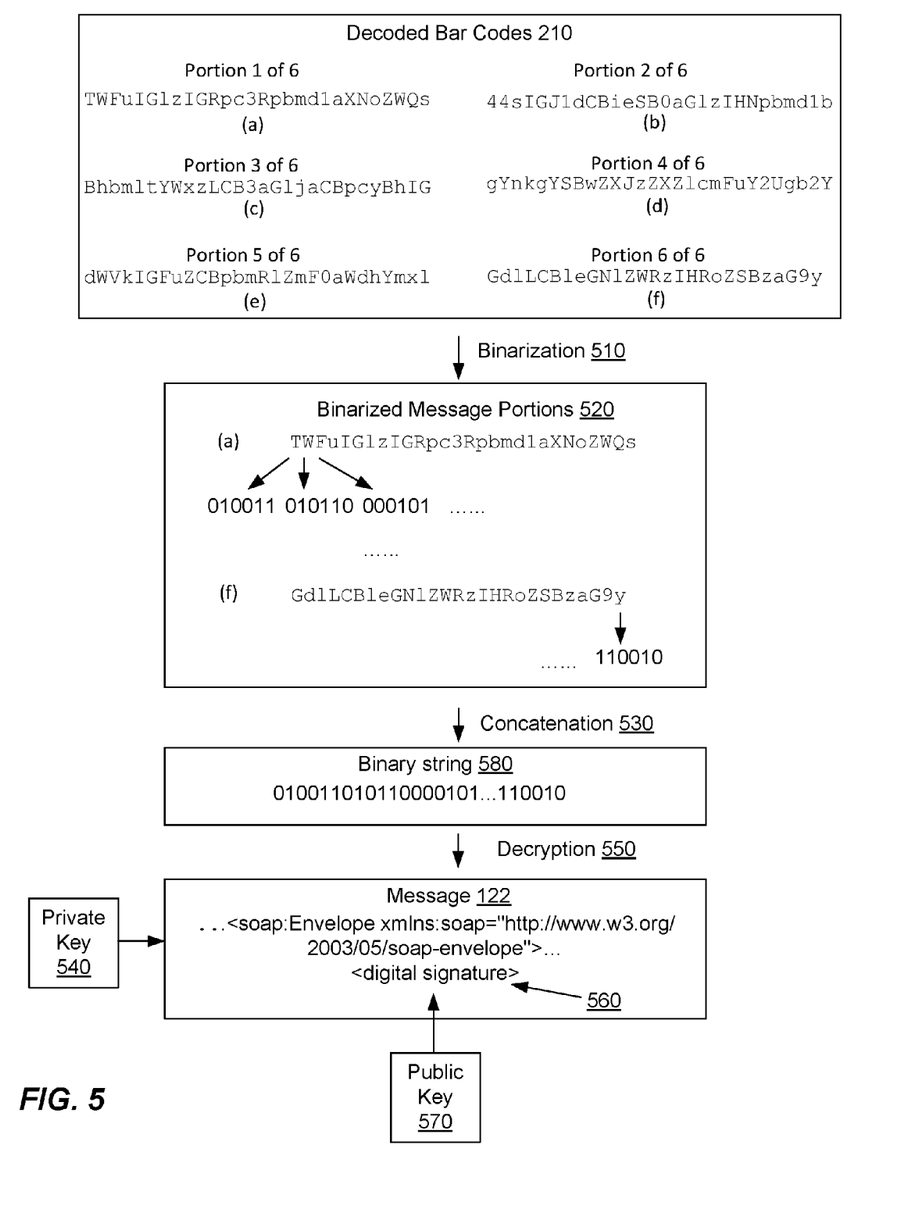
FIG. 5 is a block diagram illustrating binarization and decryption operations within the electronic environment shown in FIG. 1.

FIG. 5 illustrates detail of an example error-free decoding process 500. As discussed above in connection with FIG. 1, each message portion revealed upon decoding may be represented in a base64 format. Decoding process 500 on target device 140 (see FIG. 1) is the reverse of an encoding process in source device 110 (see FIG. 1). Thus, in this example, a first step to reproducing message 122 (see FIG. 1) is a binarization operation 510 that converts the base64 representation to the binary representation from which the base64 representation was derived. Here, each character in a base64 string is converted to the equivalent binary sextet. For example, the character "T" produces the binary digits "010011"; the character "W" produces "010110"; the character "F" produces "000101". The result for each message portion is a set of binarized message portions 520.

Target device 140 then performs a concatenation operation 510 on binarized message portions 520 to produce a binarized message. Concatenation operation 510 is the reverse of the step breaking up a binarized message on source device 110. Again, concatenation operation 510 assumes that the message portions have been sorted according to respective sequence numbers as described above.

The binarized message represents, in this example, an encrypted form of message 122. As described above, source device 110 may have encrypted message 122 using a public key belonging to a public/private key pair generated on target device 140. Target device 140 then performs a decryption operation 550 using the private key 540 from this pair, producing message 122.

In some arrangements, decryption operation 550 also reveals an encrypted digital signature 560 for additional message security. Such an encrypted digital signature 560 would be generated by source device 110 using a private key from a public/private key pair generated on source device 110. Target device 140 then uses the public key 570 from the pair to decrypt digital signature 560. If digital signature is deemed valid, then target device 140 may accept message 122; otherwise, target device 140 may reject message 122.

Figure 6:
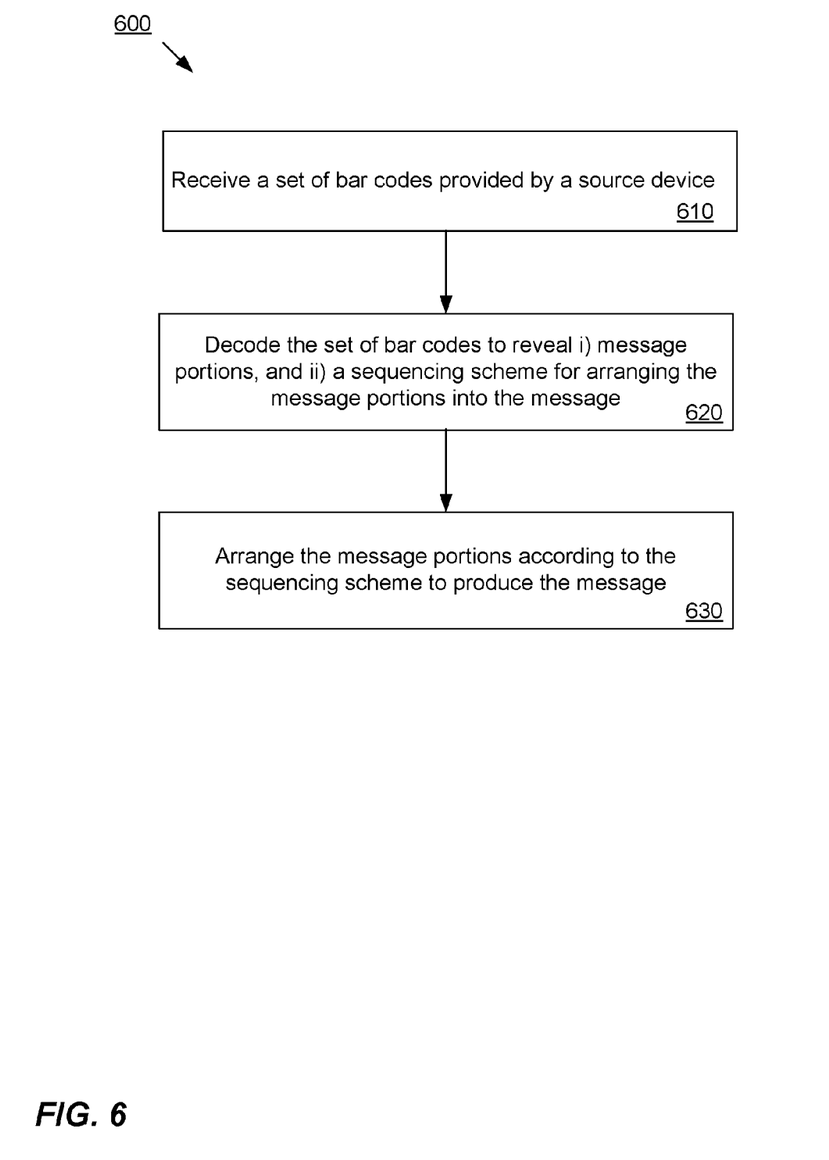
FIG. 6 is a flow chart illustrating an example method of carrying out the improved technique within the electronic environment shown in FIG. 1.

FIG. 6 illustrates a method 600 of transferring a message (e.g., message 122) into a target device, including steps 602, 604, and 606.

In step 602, a target device (e.g., target device 140) receives a set of bar codes (e.g., bar codes 180) provided by a source device (e.g., source device 110).

In step 604, the target device decodes the set of bar codes to reveal i) message portions (e.g., message portions 118), and ii) a sequencing scheme (e.g., sequencing scheme 120) for arranging the message portions into the message.

In step 606, the target device arranges the message portions according to the sequencing scheme to produce the message.

While various embodiments of the invention have been particularly shown and described, it will be understood by those skilled in the art that various changes in form and details may be made therein without departing from the spirit and scope of the invention as defined by the appended claims.

For example, while the bar codes illustrated in the above description have been formatted as data matrices, any bar code format may work, e.g., QR codes. 2D bar codes may be preferable to 1D bar codes because of the data density, but 1D bar codes may also be considered as part of this discussion.

Also, it should be understood that, while the decoding process described in FIG. 5 was applied to an error-free scan, the error-correcting techniques described in FIG. 3 and FIG. 4 may be combined with the process of FIG. 5.

Furthermore, it should be understood that some embodiments are directed to target computer 140, which is constructed and arranged to transfer a message into a target device. Some embodiments are directed to a target device. Also, some embodiments are directed to a computer program product that enables computer logic to cause a computer to transfer a message into a target device.

In some arrangements, target device 140 is implemented by a set of cores or other types of control/processing circuitry running software. In such arrangements, the software instructions can be delivered, within target device 140, either in the form of a computer program product 192, or simply instructions on disk or pre-loaded in memory 144 of target device 140, the computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of transferring a message into a target device, the method comprising:
   receiving, by the target device, a set of bar codes provided by a source device;
   decoding, by the target device, the set of bar codes to reveal i) message portions, and ii) a sequencing scheme for arranging the message portions into the message; and
   arranging, by the target device, the message portions according to the sequencing scheme to produce the message;
   wherein the source device is a first computerized apparatus that is susceptible to malware;
   wherein the target device is a second computerized apparatus that is electronically isolated from the first computerized apparatus;
   wherein the message portions revealed by decoding the set of bar codes are sections of plain text;
   wherein the sequencing scheme revealed by decoding the set of bar codes is a designated order for the sections of plain text, the designated order being encoded within the set of bar codes by the first computerized apparatus that is susceptible to malware; and
   wherein arranging the message portions according to the sequencing scheme includes placing, by the second computerized apparatus, each section of plain text into a respective message position relative to the other sections of plain text based on the designated order for the sections of plain text thus forming, as the message, a text-based communication lacking malware even when the sections of plain text are revealed in an order that is different from the designated order.

2. A method as in claim 1, wherein decoding the set of bar codes includes translating each of the set of bar codes to reveal a respective message portion;
   wherein the sequencing scheme includes an assignment of a distinct sequence number to each of the message portions to form a set of sequence numbers, the sequence number assigned to each of the message portions indicating a position in the message of that message portion; and
   wherein arranging the portions of the message includes sorting the message portions in order based on the set of sequence numbers.

3. A method as in claim 2, wherein the sequencing scheme further includes an assignment of a total number of message portions in the message to the message portions; and
   wherein the method further comprises:
      verifying, from the sequence numbers and total number of message portions in the message, that there is at least one missing message portion not received by the target device;
      outputting an error condition on an output device of the target device in response to the verifying; and
      receiving at least one bar code, the at least one bar code, upon decoding, revealing the at least one missing message portion from which the message may be produced.

4. A method as in claim 2, wherein translating each of the set of bar codes further includes revealing a respective checksum; and
   wherein the method further comprises:
      verifying, from the checksum revealed by translating one of the set of bar codes, that the message portion revealed from translating that bar code contains an error; and
      outputting an error condition on an output device of the target device in response to the verifying.

5. A method as in claim 4, where in verifying that the message portion revealed from translating that bar code contains an error includes:
   performing a hashing operation on the message portion to produce a hash of the message portion; and
   generating a difference between the hash of the message portion and the checksum.

6. A method as in claim 2, further comprising, after sorting the message portions based on the sequence numbers, concatenating the message portions to form a string containing the message.

7. A method as in claim 6, wherein each of the message portions includes a set of characters, each of the set of characters representing a base 64 number; and
   wherein the method further comprises:
      performing a binarization operation on each of the message portions to produce binarized message portions, each of the binarized message portions including a set of binary digits formed by expressing each of the characters of the set of characters of that message portion as a binary number having six digits; and
      performing a conversion operation on the binary message portions, the conversion operation converting the binary message portions into textual strings that, when concatenated, form the message.

8. A method as in claim 7, wherein performing the conversion operation includes:
obtaining a private key from a public/private key pair, the public key of the pair having been used by the source device to generate the binary string from the message; and
performing a decryption operation on the binary message portions and the private key to reveal the message.

9. A method as in claim 1, wherein the set of bar codes further includes a public key and a digital signature; and
wherein the method further comprises performing a verification operation on the digital signature and the public key, results of the verification operation including i) acceptance of the message when the public key reveals the digital signature, and ii) rejection of the message when the public key does not reveal the digital signature.

10. A method as in claim 1, wherein the message includes a set of instructions arranged as a web service message; and
wherein the method further comprises:
after arranging the portions of the message, extracting the set of instructions from the web service message; and
performing a set of operations according to the set of instructions.

11. A method as in claim 1, wherein the target device is configured to receive data only from a set of peripheral devices locally connected to the target device and to no other device,
wherein the set of peripheral devices include a bar code reading device, and
wherein receiving the set of bar codes provided by the source device includes automatically obtaining, by the bar code reading device, the set of bar codes from a medium provided by the source device.

12. A method as in claim 11, wherein the medium provided by the source device includes paper sheets on which the source device printed the set of bar codes prior to the target device receiving the set of bar codes,
wherein each of the paper sheets has a fixed number of bar codes arranged in a respective array of bar codes on that paper sheet,
wherein obtaining the set of bar codes from the medium provided by the source device includes scanning each of the paper sheets by the bar code reading device, and
wherein the method further comprises, after decoding the set of bar codes, verifying whether all of the paper sheets on which the source printed the set of bar codes have been scanned based on the revealed sequencing scheme.

13. A method as in claim 11, wherein each of the revealed message portions include a block of 64-bit character symbols, each 64-bit character symbol mapping to a sextet of binary digits,
wherein the method further comprises, for each of the set of bar codes:
mapping each 64-bit character symbol to a sextet of binary digits; and
concatenating adjacent sextets of binary digits to form a binary string representation of that bar code, and
wherein arranging the message portions according to the sequencing scheme includes (i) concatenating the respective binary string representations of the set of bar codes to form a binary string representation of the message and (ii) performing a decompression operation on the binary string representation of the message to produce the message.

14. An electronic apparatus process a message, the electronic apparatus comprising:
memory; and
control circuitry coupled to the memory, the memory storing instructions which, when carried out by the control circuitry, cause the control circuitry to:
receive a set of bar codes provided by a source device;
decode the set of bar codes to reveal i) message portions, and ii) a sequencing scheme for arranging the message portions into the message; and
arrange the message portions according to the sequencing scheme to produce the message;
wherein the source device is a first computerized apparatus that is susceptible to malware:
wherein the electronic apparatus is a second computerized apparatus that is electronically isolated from the first computerized apparatus;
wherein the message portions revealed by decoding the set of bar codes are sections of plain text;
wherein the sequencing scheme revealed by decoding the set of bar codes is a designated order for the sections of plain text, the designated order being encoded within the set of bar codes by the first computerized apparatus that is susceptible to malware; and
wherein the control circuitry, when arranging the message portions according to the sequencing scheme, is constructed and arranged to place each section of plain text into a respective message position relative to the other sections of plain text based on the designated order for the sections of plain text thus forming, as the message, a text-based communication lacking malware even when the sections of plain text are revealed in an order that is different from the designated order.

15. An electronic apparatus as in claim 14, wherein the instructions causing the control circuitry to decode the set of bar codes further cause the control circuitry to translate each of the set of bar codes to reveal a respective portion of the message;
wherein the sequencing scheme includes an assignment of a distinct sequence number to each of the message portions to form a set of sequence numbers, the sequence number assigned to each of the message portions indicating a position in the message of that message portion; and
wherein the instructions causing the control circuitry to arrange the portions of the message further cause the control circuitry to sort the message portions in order based on the set of sequence numbers.

16. An electronic apparatus as in claim 15, wherein the sequencing scheme further includes an assignment of a total number of message portions in the message to the message portions; and
wherein the instructions further cause the control circuitry to:
verify, from the sequence numbers and total number of message portions in the message, that there is at least one missing message portion not received by the electronic apparatus;
output an error condition on an output device in response to the verifying; and
receive at least one bar code, the at least one bar code, upon decoding, revealing the at least one missing message portion from which the message may be produced.

17. An electronic apparatus as in claim 15, wherein the instructions causing the control circuitry to translate each of the set of bar codes further cause the control circuitry to reveal a respective checksum; and     wherein the instructions further cause the control circuitry to:

verify, from the checksum revealed by translating one of the set of bar codes, that the message portion revealed from translating that bar code contains an error; and         output an error condition on an output device in response to the verifying.

18. An electronic apparatus as in claim 15, wherein the instructions further cause the control circuitry to, after sorting the message portions based on the sequence numbers, concatenate the message portions to form a single string containing the message.

19. An electronic apparatus as in claim 18, wherein each of the message portions includes a set of characters, each of the set of characters representing a base 64 number; and     wherein the instructions further cause the control circuitry to:

perform a binarization operation on each of the message portions to produce binarized message portions, each of the binarized message portions including a set of binary digits formed by expressing each of the characters of the set of characters of that message portion as a binary number having six digits; and         perform a conversion operation on the binary message portions, the conversion operation converting the binary message portions into textual strings that, when concatenated, form the message.

20. An electronic apparatus as in claim 19, wherein the instructions causing the control circuitry to perform the conversion operation further cause the control circuitry to:

obtain a private key from a public/private key pair, the public key of the pair having been used by the source device to generate the binary message portions from the message; and     perform a decryption operation on the binary string and the private key to reveal the message.

21. An electronic apparatus as in claim 14, wherein the set of bar codes further includes a public key and a digital signature; and     wherein the instructions further cause the control circuitry to perform a verification operation on the digital signature and the public key, results of the verification operation including i) acceptance of the message when the public key reveals the digital signature, and ii) rejection of the message when the public key does not reveal the digital signature.

22. An electronic apparatus as in claim 14, wherein the message includes a set of instructions arranged as a SOAP message;

wherein the instructions further cause the control circuitry to:

after arranging the portions of the message, extract the set of instructions from the SOAP message; and         perform a set of operations according to the set of instructions.

23. A computer program product comprising a non-transitory, computer-readable storage medium which stores executable code, which, when executed by a target device, causes the computing device to perform a method of processing a message from a source device, the method comprising:

receiving, by the target device, a set of bar codes provided by a source device;

decoding, by the target device, the set of bar codes to reveal i) message portions, and ii) a sequencing scheme for arranging the message portions into the message; and     arranging, by the target device, the message portions according to the sequencing scheme to produce the message;

wherein the source device is a first computerized apparatus that is susceptible to malware;

wherein the target device is a second computerized apparatus that is electronically isolated from the first computerized apparatus;

wherein the message portions revealed by decoding the set of bar codes are sections of plain text;

wherein the sequencing scheme revealed by decoding the set of bar codes is a designated order for the sections of plain text, the designated order being encoded within the set of bar codes by the first computerized apparatus that is susceptible to malware; and wherein arranging the message portions according to the sequencing scheme includes placing, by the second computerized apparatus, each section of plain text into a respective message position relative to the other sections of plain text based on the designated order for the sections of plain text thus forming, as the message, a text-based communication lacking malware even when the sections of plain text are revealed in an order that is different from the designated order.

* * * * *